United States Patent
Yamashita et al.

(10) Patent No.: US 12,062,753 B2
(45) Date of Patent: Aug. 13, 2024

(54) NONAQUEOUS ELECTROLYTE SECONDARY BATTERY

(71) Applicant: SANYO Electric Co., Ltd., Daito (JP)

(72) Inventors: Keisuke Yamashita, Osaka (JP); Shimpei Yamagami, Osaka (JP)

(73) Assignee: PANASONIC ENERGY CO., LTD., Osaka (JP)

(*) Notice: Subject to any disclaimer, the term of this patent is extended or adjusted under 35 U.S.C. 154(b) by 229 days.

(21) Appl. No.: 16/652,919

(22) PCT Filed: Oct. 2, 2018

(86) PCT No.: PCT/JP2018/036790
§ 371 (c)(1),
(2) Date: Apr. 1, 2020

(87) PCT Pub. No.: WO2019/069890
PCT Pub. Date: Apr. 11, 2019

(65) Prior Publication Data
US 2020/0321593 A1 Oct. 8, 2020

(30) Foreign Application Priority Data
Oct. 6, 2017 (JP) .................................. 2017-195923

(51) Int. Cl.
*H01M 10/0525* (2010.01)
*H01M 10/0587* (2010.01)
(Continued)

(52) U.S. Cl.
CPC ... *H01M 10/0525* (2013.01); *H01M 10/0587* (2013.01); *H01M 50/538* (2021.01); *H01M 50/119* (2021.01)

(58) Field of Classification Search
CPC ........... H01M 50/538; H01M 10/0525; H01M 10/0587; H01M 50/119; H01M 50/107; Y02P 70/50; Y02E 60/10
See application file for complete search history.

(56) References Cited

U.S. PATENT DOCUMENTS

| | | |
|---|---|---|
| 2003/0099880 A1 | 5/2003 | Park et al. |
| 2006/0115736 A1 | 6/2006 | Hashimoto et al. |
| (Continued) | | |

FOREIGN PATENT DOCUMENTS

| | | |
|---|---|---|
| CN | 1423358 A | 6/2003 |
| CN | 101615694 A | 12/2009 |
| (Continued) | | |

OTHER PUBLICATIONS

English Translation of Office Action dated Dec. 29, 2021, issued in counterpart CN Application No. 201880063675.7. (4 pages).

(Continued)

*Primary Examiner* — Daniel S Gatewood
(74) *Attorney, Agent, or Firm* — WHDA, LLP

(57) ABSTRACT

The present disclosure aims to provide, even when a strong impact is applied to a battery, a nonaqueous electrolyte secondary battery excellent in impact resistance so as not to ignite, smoke, and the like by internal short circuit. A nonaqueous electrolyte secondary battery according to one example of an embodiment: includes a positive electrode in which exposed portions and are formed at central portions in a longitudinal direction of a positive electrode collector; a positive electrode tab bonded to the exposed portion; an insulating tape adhered to the positive electrode to cover the exposed portion; and an insulating tape adhered to the positive electrode to cover the exposed portion. The insulating tapes are adhered to the positive electrode so that width-direction ends and/or the other width-direction ends (Continued)

are not overlapped with each other in a thickness direction of the positive electrode.

7 Claims, 4 Drawing Sheets

(51) Int. Cl.
*H01M 50/119* (2021.01)
*H01M 50/538* (2021.01)

(56) References Cited

U.S. PATENT DOCUMENTS

| | | |
|---|---|---|
| 2010/0035144 A1 | 2/2010 | Oh et al. |
| 2011/0159344 A1* | 6/2011 | Kobayashi .............. C09J 7/38 |
| | | 429/130 |
| 2014/0120417 A1 | 5/2014 | Matsushita et al. |
| 2017/0309951 A1 | 10/2017 | Ishikawa et al. |
| 2018/0254505 A1* | 9/2018 | Kang ................. H01M 50/595 |
| 2020/0303782 A1* | 9/2020 | Yatomi ................ H01M 4/366 |

FOREIGN PATENT DOCUMENTS

| | | | | |
|---|---|---|---|---|
| CN | 103794749 A | | 5/2014 | |
| JP | 2001-135298 A | | 5/2001 | |
| JP | 2006-134758 A | | 5/2006 | |
| JP | 2010-3697 A | | 1/2010 | |
| JP | 2010055906 | * | 3/2010 | |
| JP | 2010055906 A | * | 3/2010 | |
| KR | 20040055423 | * | 6/2004 | |
| KR | 20040055423 A | * | 6/2004 | |
| WO | 2016/121339 A1 | | 8/2016 | |
| WO | 2017/090932 A1 | | 6/2017 | |
| WO | WO-2017090932 A1 | * | 6/2017 | ............ H01M 10/04 |
| WO | WO-2017163932 A1 | * | 9/2017 | .......... H01M 10/052 |

OTHER PUBLICATIONS

International Search Report dated Jan. 15, 2019, issued in counterpart application No. PCT/JP2018/036790, with English translation. (4 pages).

English Translation of Chinese Office Action dated Jul. 14, 2022, issued in counterpart CN application No. 201880063675.7. (3 pages).

* cited by examiner

NONAQUEOUS ELECTROLYTE SECONDARY BATTERY

TECHNICAL FIELD

The present disclosure relates to a nonaqueous electrolyte secondary battery.

BACKGROUND ART

Heretofore, in a nonaqueous electrolyte secondary battery including a winding type electrode body, a structure has been known in which at an intermediate portion in a longitudinal direction of a belt-shaped electrode which forms the electrode body, at least one exposed portion at which a surface of a collector is exposed is formed, and a tab for the collector is connected to this exposed portion. In addition, at the exposed portion, since a mixture layer is not provided, and a collector having a low resistance is exposed, when internal short circuit occurs at the exposed portion, a large current flows through a short-circuited place, and the amount of heat generated thereby is increased. Hence, an insulating tape to cover the exposed portion is adhered to the electrode (for example, see PTL 1). Since the exposed portions are formed at two surfaces of the electrode so as to be overlapped with each other in a thickness direction thereof, the insulating tapes are adhered to the two surfaces of the electrode. Since a high load is to be applied when the battery is charged or discharged, the electrode tab and the exposed portion of the collector are liable to be heated to a high temperature, and hence, the insulating tapes are each required to have a thickness and heat resistance to a certain extent.

CITATION LIST

Patent Literature

PTL 1: Japanese Published Unexamined Patent Application No. 2001-135298

SUMMARY OF INVENTION

Technical Problem

Incidentally, in a nonaqueous electrolyte secondary battery, even when a strong impact is applied to the battery, the battery is required not to ignite, smoke, and the like by internal short circuit. As one factor to cause the short circuit when an impact is applied to the battery, an insulating tape which covers an exposed portion may be mentioned. In particular, it is assumed that due to the thickness of the insulating tape, a part of a separator with which one end of the tape is in contact is fractured, and hence, the short circuit occurs. In addition, although an increase in impact resistance of the battery has also been conceived by an increase in strength of an exterior package can, a separator, and the like, since having an adverse influence on a battery capacity, the increase in impact resistance of the battery described above is difficult to achieve together with a further increase in capacity.

Solution to Problem

A nonaqueous electrolyte secondary battery according to an aspect of the present disclosure is a nonaqueous electrolyte secondary battery which comprises: an electrode body in which a positive electrode and a negative electrode are wound with at least one separator interposed therebetween, at least one of the positive electrode and the negative electrode including a belt-shaped collector, mixture layers formed on two surfaces of the collector, and a pair of exposed portions at which the two surfaces of the collector are exposed; an electrode tab bonded to one of the pair of exposed portions; a first insulating tape adhered to the electrode so as to cover one of the pair of exposed portions; and a second insulating tape adhered to the electrode so as to cover the other one of the pair of exposed portions. In the nonaqueous electrolyte secondary battery described above, the first insulating tape and the second insulating tape are disposed so that one ends thereof located at at least one direction side along a longitudinal direction of the electrode are not overlapped with each other in a thickness direction of the electrode.

Advantageous Effects of Invention

According to the aspect of the present disclosure, even when a strong impact is applied to the battery, a nonaqueous electrolyte secondary battery which has an excellent impact resistance and which is not likely to ignite, smoke, and the like by internal short circuit can be provided.

DESCRIPTION OF EMBODIMENT

As described above, in a nonaqueous electrolyte secondary battery, such as a lithium ion battery, even when a strong impact is applied to the battery, to prevent ignition, smoking, and the like caused by internal short circuit is an important subject. Through research carried out by the present inventors, it was found that in a related battery, a separator is fractured at a position corresponding to one end of an insulating tape which covers an exposed portion of an electrode, and short circuit may be generated thereby in some cases. When an impact is applied to the battery so as to crush an electrode body, a shearing force is applied to the separator by a step adjacent thereto formed by the end of the insulating tape, and hence, it is believed that the separator is sheared at the position which is in contact with the end of the insulating tape.

Accordingly, the present inventors found that when a related adhesion mode in which a first insulating tape and a second insulating tape cover one exposed portion and the other exposed portion, respectively, is carefully investigated and is appropriately optimized, the shearing of a separator by the insulating tape can be suppressed. In particular, the first insulating tape and the second insulating tape are disposed so that one ends thereof located at one direction side along a longitudinal direction of an electrode are not overlapped with each other in a thickness direction of the electrode, that is, the one ends of the respective tapes are disposed so as not be overlapped with each other in the thickness direction of the electrode. Accordingly, a shearing force to be applied to the separator is dispersed, and hence, the shearing of the separator is believed to be suppressed. One direction along the longitudinal direction of the electrode may be arbitrarily selected from two directions along the longitudinal direction of the electrode. As described below, the first insulating tape and the second insulating tape are preferably disposed so that the other ends thereof opposite to the one direction side along the longitudinal direction of the electrode are not overlapped with each other in the thickness direction of the positive electrode.

Hereinafter, one example of an embodiment will be described in detail. Although a cylindrical battery in which a winding type electrode body 14 is received in a cylindrical battery case 15 will be described below by way of example, the battery case is not limited to have a cylindrical shape and may have, for example, a square shape (square battery). In addition, in this specification, for the convenience of illustration, a sealing body 17 side of the battery case 15 and a bottom side of an exterior package can 16 will be described as "upper" and "lower", respectively.

Figure 1:
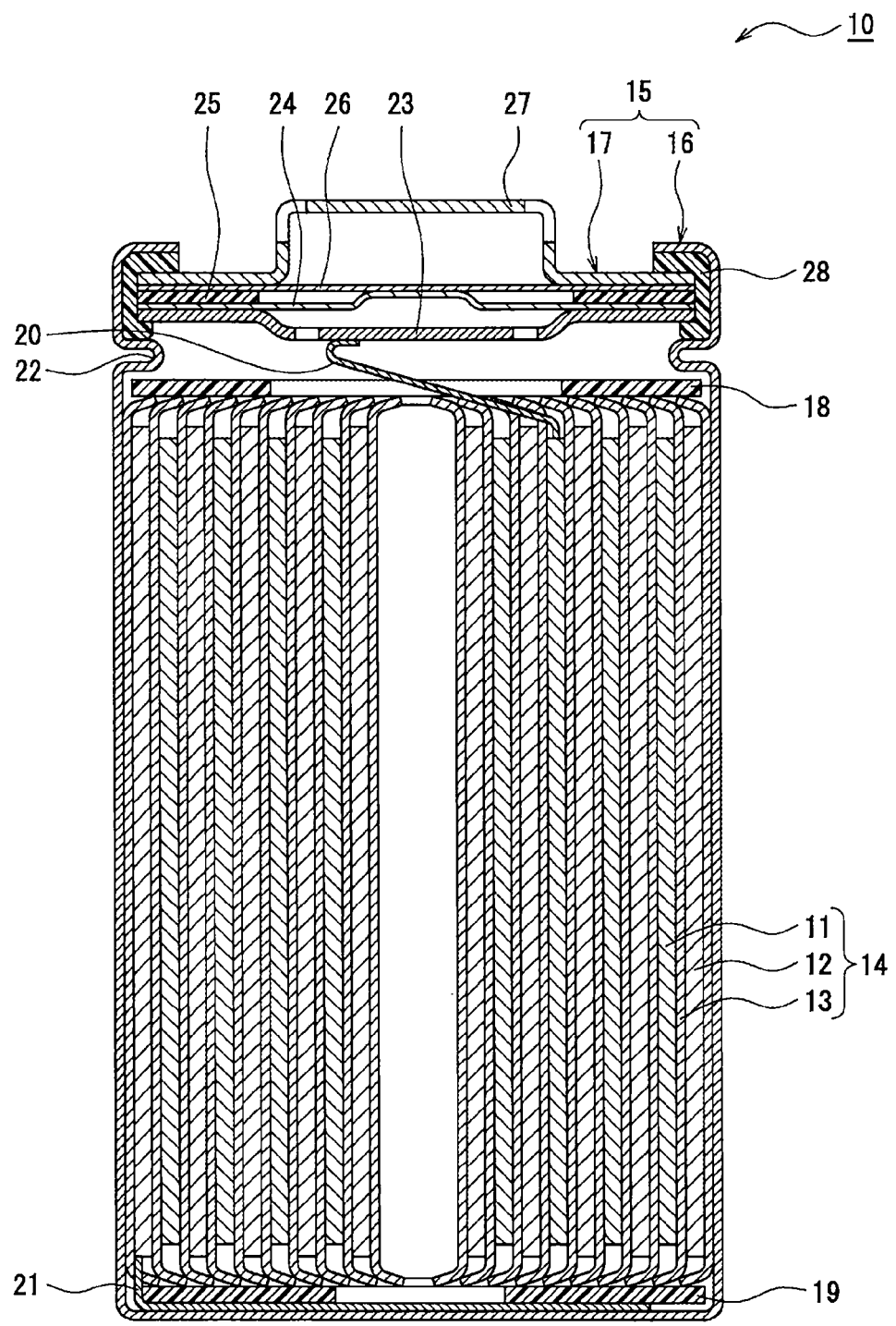
FIG. 1 is a longitudinal cross-sectional view of a nonaqueous electrolyte secondary battery which is one example of an embodiment.
Figure 2:
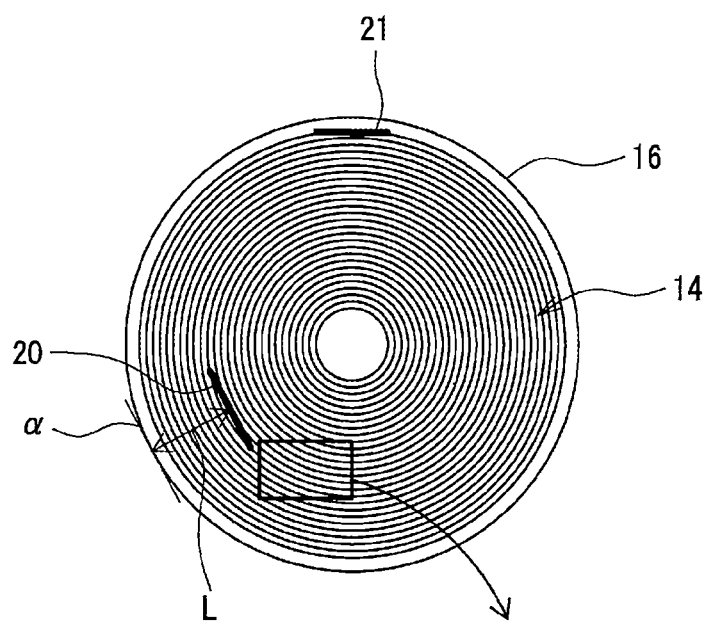
FIG. 2 is a transverse cross-sectional view of the nonaqueous electrolyte secondary battery which is one example of the embodiment.
Figure 2:
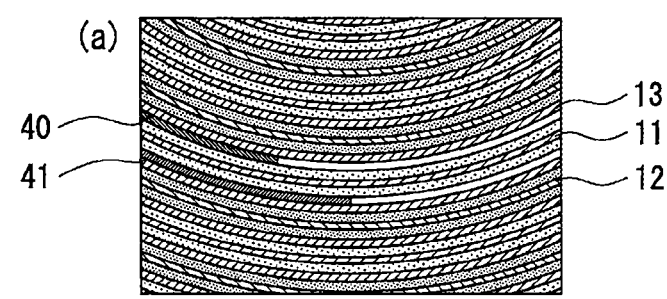
Figure 2:
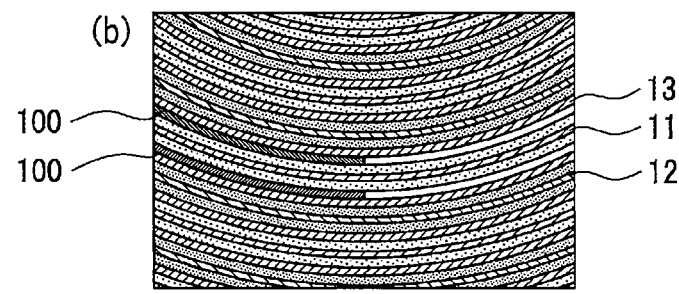

FIG. 1 is a longitudinal (axial direction) cross-sectional view of a nonaqueous electrolyte secondary battery 10 which is one example of the embodiment, and FIG. 2 is a transverse (radius direction) cross-sectional view of the nonaqueous electrolyte secondary battery 10. In FIG. 2, (a) is an enlarged view of portions of the electrode body 14 to which insulating tapes 40 and 41 are adhered. (b) shows an adhesion mode of related insulating tapes 100 as a comparative example.

As shown in FIGS. 1 and 2, the nonaqueous electrolyte secondary battery 10 includes the winding type electrode body 14, a nonaqueous electrolyte (not shown), and the battery case 15 receiving the electrode body 14 and the nonaqueous electrolyte. The battery case 15 is formed of a bottom-closed cylindrical exterior package can 16 and a sealing body 17 which seals an opening portion of the exterior package can 16. In addition, the nonaqueous electrolyte secondary battery 10 also includes a resin-made gasket 28 disposed between the exterior package can 16 and the sealing body 17.

The electrode body 14 is formed by winding a positive electrode 11 and a negative electrode 12 with at least one separator 13 interposed therebetween. For the separator 13, a porous sheet having an ion permeability and an insulating property may be used. The separator 13 may have either a monolayer or multilayer structure and is formed, for example, of a polyolefin resin, such as a polyethylene or a polypropylene, or a cellulose. When a polyolefin resin is used, on a surface of a base material formed of a polyolefin resin, a heat resistant layer is preferably provided by applying an aramid resin. A heat resistant layer may also be formed using a resin containing ceramic particles. In addition, the nonaqueous electrolyte secondary battery 10 includes the insulating tapes 40 and 41 (see FIG. 2(a)) to be adhered to the positive electrode 11.

The nonaqueous electrolyte contains a nonaqueous solvent and an electrolyte salt dissolved therein. As the nonaqueous solvent, for example, there may be used an ester, an ether, a nitrile, an amide, or a mixed solvent containing at least two of the solvents mentioned above. The nonaqueous solvent may also contain a halogen substitute in which at least one hydrogen atom of each of the solvents mentioned above is replaced by a halogen atom, such as fluorine. In addition, the nonaqueous electrolyte is not limited to a liquid electrolyte and may be a solid electrolyte using a gel polymer or the like. As the electrolyte salt, for example, a lithium salt, such as $LiFF_6$, may be used.

Insulating plates 18 and 19 are disposed at an upper side and a lower side of the electrode body 14, respectively. In the example shown in FIG. 1, a positive electrode tab 20 fitted to the positive electrode 11 extends to the sealing body 17 side through a through-hole in the insulating plate 18, and a negative electrode tab 21 fitted to the negative electrode 12 extends to the bottom side of the exterior package can 16 along an outside of the insulating plate 19. The positive electrode tab 20 is connected to a lower surface of a filter 23 which is a bottom plate of the sealing body 17, and a cap 27 which is a top plate of the sealing body 17 and which is electrically connected to the filter 23 functions as a positive electrode terminal. The negative electrode tab 21 is connected to an inner surface of the bottom of the exterior package can 16, and the exterior package can 16 functions as a negative electrode terminal.

The exterior package can 16 is, for example, a metal-made bottom-closed cylindrical container. As described above, the gasket 28 is provided between the exterior package can 16 and the sealing body 17, and an inner space of the battery case 15 is air-tightened. The exterior package can 16 has a groove portion 22 which is formed to support the sealing body 17, for example, by pressing a side surface portion from the outside. The groove portion 22 is preferably formed to have a ring shape along a circumferential direction of the exterior package can 16 and supports the sealing body 17 by its upper surface. In addition, an upper end portion of the exterior package can 16 is bent inside and is caulked at a peripheral portion of the sealing body 17.

The sealing body 17 has a structure in which the filter 23, a lower valve 24, an insulating member 25, an upper valve 26, and the cap 27 are laminated in this order from an electrode body 14 side. The members forming the sealing body 17 each have, for example, a disc shape or a ring shape, and the members except for the insulating member 25 are electrically connected to each other. The lower valve 24 and the upper valve 26 are connected to each other at central portions thereof, and the insulating member 25 is provided between peripheral portions thereof. When the inside pressure of the battery is increased by abnormal heat generation, the lower valve 24 is deformed so as to lift the upper valve 26 to a cap 27 side and is then fractured, and as a result, a current path between the lower valve 24 and the upper valve 26 is blocked. When the inside pressure is further increased, the upper valve 26 is fractured, and gas is discharged through an opening portion formed in the cap 27.

As shown in FIG. 2, in the winding type electrode body 14, the positive electrode tab 20 is fitted between a winding core and an outer circumferential surface located at an outside end in a radius direction, and the negative electrode tab 21 is fitted to the outer circumferential surface or the vicinity thereof. The positive electrode tab 20 is provided at a position apart from the outer circumferential surface of the exterior package can 16 having a cylindrical shape in the radius direction thereof preferably by 4.0 mm or more and more preferably by 4.5 mm or more. In other words, a length L from the outer circumferential surface of the exterior package can 16 to the positive electrode tab 20 in a direction orthogonal to a tangent line a of the outer circumferential surface is preferably 4.0 mm or more and more preferably 4.5 mm or more. In this case, a portion of the electrode body 14 located outside than the positive electrode tab 20 in the radius direction functions as a sufficient buffer and absorbs an impact, and hence, a shearing force applied to portions at which the ends of the insulating tapes 40 and 41 are in contact with the separator 13 can be reduced.

Figure 3:
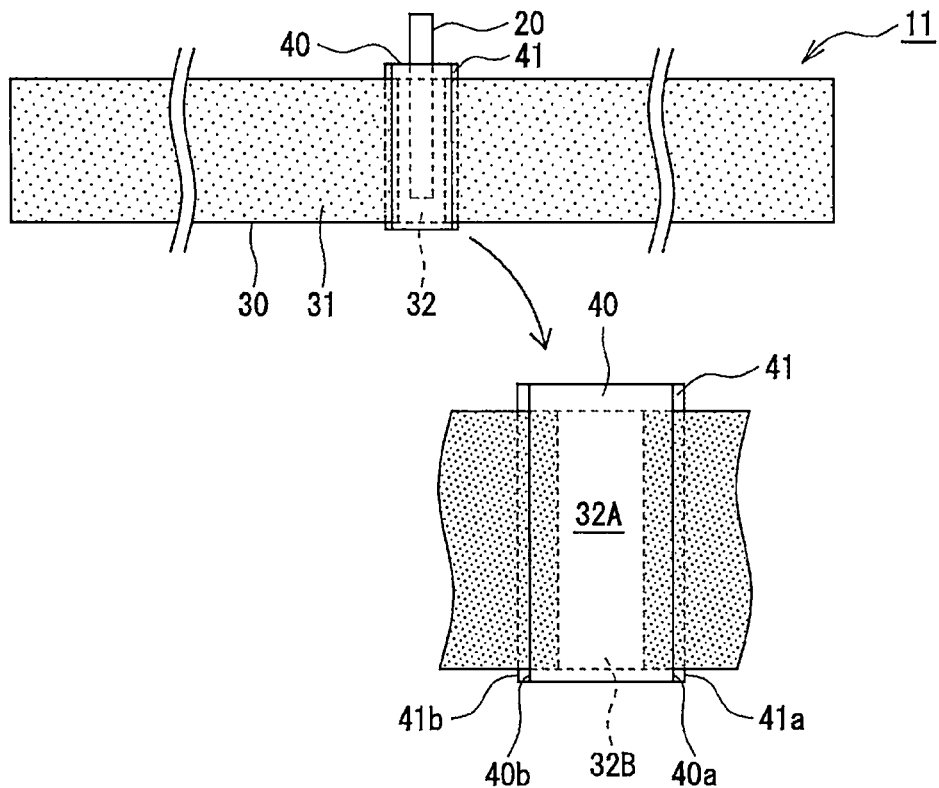
FIG. 3 is a front view of a positive electrode which is one example of the embodiment.
Figure 4:
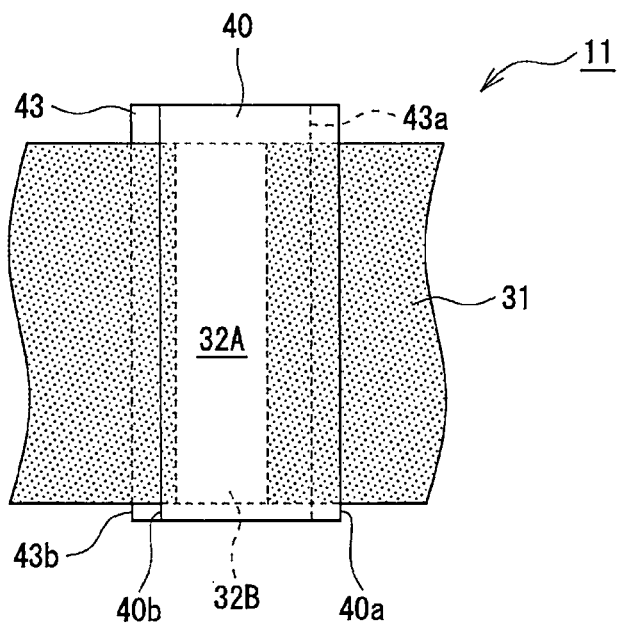
FIG. 4 is an enlarged front view of an exposed portion and the vicinity thereof of a positive electrode which is another example of the embodiment (a positive electrode tab is not shown).
Figure 5:
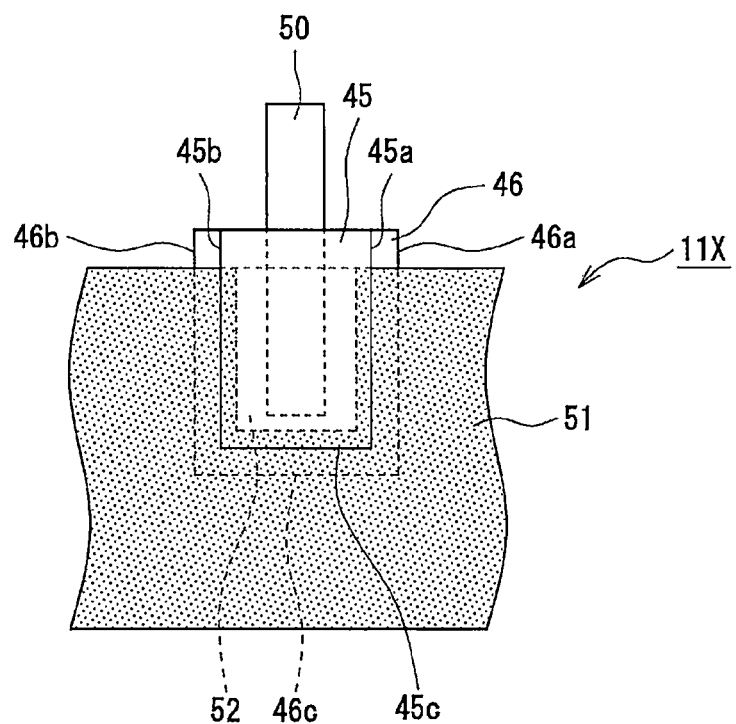
FIG. 5 is an enlarged front view of an exposed portion and the vicinity thereof of a positive electrode which is another example of the embodiment.

Hereinafter, with reference to FIGS. 2 to 5, the electrodes forming the electrode body 14 and the insulating tapes to be adhered to the electrodes will be described in detail. FIGS. 3 to 5 each show a front view of the positive electrode, and the positive electrode tab 20 is not shown in the enlarged view of FIG. 3 and in FIG. 4.

[Positive Electrode]

As shown in FIG. 3, the positive electrode 11 includes a belt-shaped positive electrode collector 30 and positive electrode mixture layers 31 formed on two surfaces of the collector. In the positive electrode 11, a pair of exposed portions 32 at which the two surfaces of the positive electrode collector 30 are exposed is formed at an intermediate portion in a longitudinal direction of the collector, and to one of the pair of exposed portions 32, the positive electrode tab 20 is bonded. For the positive electrode collector 30, for example, foil made from a metal, such as aluminum, or a film having a surface layer formed of the metal mentioned above may be used. A preferable positive electrode collector 30 is foil made of a metal containing aluminum or an aluminum alloy as a primary component. The thickness of the positive electrode collector 30 is, for example, 10 to 30 μm.

The positive electrode mixture layers 31 are preferably formed over the entire two surfaces of the positive electrode collector 30 except for the exposed portions 32. The positive electrode mixture layer 31 preferably contains a positive electrode active material, an electrically conductive material, and a binder. The positive electrode 11 may be formed such that a positive electrode mixture slurry containing the positive electrode active material, the electrically conductive material, the binder, and a solvent, such as N-methyl-2-pyrrolidone (NMP), is applied on the two surfaces of the positive electrode collector 30, followed by compressing the coating films thus formed.

As the positive electrode active material, a lithium composite metal oxide containing a metal element, such as Co, Mn, or Ni, may be mentioned by way of example. Although the composition of the lithium composite metal oxide is not particularly limited, a composite oxide represented by a general formula of $Li_{1+x}MO_2$ (in the formula, $-0.2<x\leq0.2$ is satisfied, and M represents at least one of Ni, Co, Mn, and Al) is preferable.

As an example of the electrically conductive material, for example, a carbon material, such as carbon black (CB), acetylene black (AB), Ketjen black, or graphite, may be mentioned. As an example of the binder, for example, there may be mentioned a fluorinated resin, such as a polytetrafluoroethylene (PTFE) or a poly(vinylidene fluoride) (PVdF), a polyacrylonitrile (PAN), a polyimide (PI), an acrylic resin, or a polyolefinic resin. In addition, together with at least one of those resins mentioned above, a carboxymethyl cellulose (CMC) or its salt, a poly(ethylene oxide) (PEO), or the like may be used in combination.

In the positive electrode 11, as described above, the exposed portions 32 are formed at the intermediate portions in the longitudinal direction of the positive electrode collector 30. The exposed portions 32 are each a portion at which the surface of the positive electrode collector 30 is not covered with the positive electrode mixture layer 31 and are provided at the two surfaces of the positive electrode 11 so as to be overlapped with each other in the thickness direction thereof. In the example shown in FIG. 3, at the center in the longitudinal direction of the positive electrode 11 or the vicinity thereof, the exposed portions 32 are formed at the respective surfaces of the positive electrode 11 in the thickness direction. In addition, the exposed portions 32 are each formed to have a predetermined width over the entire length in a short direction of the positive electrode 11.

The nonaqueous electrolyte secondary battery 10 includes the insulating tape 40 (first insulating tape) adhered to the positive electrode 11 so as to cover one (hereinafter, referred to as "exposed portion 32A") of the pair of exposed portions 32 and the insulating tape 41 (second insulating tape) adhered to the positive electrode 11 so as to cover the other one (hereinafter, referred to as "exposed portion 32B") of the pair of exposed portions 32. Since the positive electrode tab 20 is bonded to the first exposed portion 32A as described above, the insulating tape 40 is partially adhered to the positive electrode tab 20. The insulating tape 40 is preferably adhered to the entire portion of the positive electrode tab 20 located on the positive electrode collector 30.

In the example shown in FIG. 3, the insulating tape 40 covers the entire region of the exposed portion 32A, and the insulating tape 41 also covers the entire region of the exposed portions 32B. The exposed portions 32A and 32B are formed to have the same width, and the positions of two width-direction ends of the respective exposed portions are aligned with each other. That is, the width-direction ends of the exposed portions 32A and 32B are overlapped with each other in the thickness direction of the positive electrode 11, and the other width-direction ends of the exposed portions 32A and 32B are also overlapped with each other in the thickness direction of the positive electrode 11. In this specification, in the exposed portions 32A and 32B and the insulating tapes 40 and 41, the direction along the longitudinal direction of the positive electrode 11 is called "width direction", and the widths of the exposed portions 32A and 32B are each, for example, 5 to 7 mm.

The widths of the insulating tapes 40 and 41 are each larger than each of the widths of the positive electrode tab 20 and the exposed portions 32A and 32B and each have a long rectangular shape in the short direction of the positive electrode 11 when viewed in front. The widths of the insulating tapes 40 and 41 are each, for example, 9 to 12 mm. The insulating tapes 40 and 41 are also partially adhered onto the positive electrode mixture layers 31 formed at two width-direction sides of the exposed portions 32A and 32B, respectively. In addition, the insulating tapes 40 and 41 partially extend past the positive electrode collector 30 in upper and lower directions and are adhered to a root of a portion of the positive electrode tab 20 which extends past the positive electrode collector 30 in the upper direction.

As shown in FIGS. 2(a) and 3, the insulating tapes 40 and 41 are disposed so that width-direction ends 40a and 41a thereof located at one direction side along the longitudinal direction of the positive electrode 11 are not overlapped with each other in the thickness direction of the positive electrode 11, and the other width-direction ends 40b and 41b thereof opposite to one direction side along the longitudinal direction of the positive electrode 11 are not overlapped with each other in the thickness direction of the positive electrode 11. That is, the insulating tapes 40 and 41 are adhered to the positive electrode 11 so that the positions of the two width-direction ends of the insulating tape 40 are shifted from the positions of the respective two width-direction ends of the insulating tape 41 in the longitudinal direction of the positive electrode 11. Since the adhesion mode is formed as described above, even when a force to crush the electrode body 14 is applied to the battery, the shearing force applied to the separator 13 is dispersed, and the shearing of the separator 13 is suppressed.

On the other hand, as shown in FIG. 2(*b*), in a related battery in which two insulating tapes 100 are adhered to the positive electrode 11 so that two width-direction ends of one insulating tape 100 are aligned with respective two width-direction ends of the other insulating tape 100, a large step having a thickness equivalent to that of the two tapes is formed at a position corresponding to each of the two width-direction ends of the insulating tape 100. Hence, when a force to crush the electrode body 14 is applied to the battery, a large shearing force is applied to the separator 13 at the position corresponding to each of the two width-direction ends of the insulating tape 100. Hence, it is believed that at the position corresponding to each of the two width-direction ends of the insulating tape 100, the separator 13 is liable to be fractured.

In the nonaqueous electrolyte secondary battery 10, in accordance with the above adhesion mode of the insulating tapes 40 and 41, the defect as described above can be overcome. Although the insulating tapes are preferably adhered to the positive electrode 11 so that the width-direction ends 40*a* and 41*a* are not overlapped with each other in the thickness direction of the positive electrode 11 and the other width-direction ends 40*b* and 41*b* are also not overlapped with each other in the thickness direction thereof, when the position of at least one of the width-direction ends of the insulating tape 40 is not overlapped with the position of the corresponding at least one of the width-direction ends of insulating tape 41 in the thickness direction of the positive electrode 11, the effect of the present disclosure can also be obtained. That is, the first insulating tape 40 and the second insulating tape 41 may be disposed so that the width-direction ends of the two insulating tapes located at at least one direction side along the longitudinal direction of the positive electrode 11 are not overlapped with each other in the thickness direction of the positive electrode 11.

The width-direction ends 40*a* and 41*a* of the insulating tapes 40 and 41 are preferably disposed to be shifted in the longitudinal direction of the positive electrode 11 by 0.5 mm or more. The other width-direction ends 40*b* and 41*b* are also preferably disposed to be shifted in the longitudinal direction of the positive electrode 11 by 0.5 mm or more. In addition, in a related battery manufacturing process, manufacturing conditions are set so that the positions of the width-direction ends of the tapes are aligned with each other, and no batteries in which the two width-direction ends of the tapes are shifted, for example, by 0.5 mm are manufactured.

Although the widths of the insulating tapes 40 and 41 may be different from each other. In the example shown in FIG. 3, the width of the insulating tape 41 adhered to the other surface of the positive electrode 11 to cover the exposed portion 32B is larger than the width of the insulating tape 40 adhered to the surface of the positive electrode 11 to cover the exposed portion 32A. Since the tapes having different widths are used, the above adhesion mode in which the positions of the two width-direction ends of one tape are shifted from the positions of the respective two width-direction ends of the other tape in the longitudinal direction of the positive electrode 11 can be easily realized.

The width of the insulating tape 41 is preferably larger than the width of the insulating tape 40 by 1 mm or more. The difference in width between the insulating tapes 40 and 41 is, for example, 1 to 3 mm. When the difference in width between the insulating tapes 40 and 41 is 1 mm, the tapes are preferably adhered to the positive electrode 11 such that the two width-direction ends thereof are shifted from each other by 0.5 mm. In the example shown in FIG. 3, the insulating tapes 40 and 41 are adhered symmetrically with respect to the centers in the width direction of the exposed portions 32A and 32B (line symmetry with respect to an imaginary line along an up-down direction passing through the center in the width direction), respectively. That is, the width-direction lengths of the insulating tape 40 provided on the positive electrode mixture layer 31 at two width-direction sides of the exposed portion 32A are equal to each other.

The lengths of the insulating tapes 40 and 41 in the up-down direction may be equal to each other, and the positions of upper and lower ends thereof may be aligned with each other. The reason for this is that since the upper and the lower ends of the insulating tapes 40 and 41 extend past the upper and lower ends of the positive electrode 11, respectively, a large shearing force is not applied to the separator 13 at portions corresponding to the upper and the lower ends of the tapes.

As shown in FIG. 4, on the respective surfaces of the positive electrode 11, insulating tapes 40 and 43 having the same width may be adhered. However, in this case, width-direction ends 40*a* and 43*a* are adhered to the positive electrode 11 so as not to be overlapped with each other in the thickness direction of the positive electrode 11, and the other width-direction ends 40*b* and 43*b* are also adhered to the positive electrode 11 so as not to be overlapped with each other in the thickness direction of the positive electrode 11. In the example shown in FIG. 4, the insulating tape 43 which covers the exposed portion 32B is adhered on the other surface of the positive electrode 11 symmetrically with respect to the center in the width-direction of the exposed portion 32B. On the other hand, the insulating tape 40 which covers the exposed portion 32A is adhered asymmetrically with respect to the center in the width-direction of the exposed portion 32A, and hence, the above adhesion mode in which the positions of the two width-direction ends of the tape are shifted from the positions of the respective two width-direction ends of the other tape in the longitudinal direction of the positive electrode 11 can be realized.

As shown in FIG. 5, exposed portions 52 may be formed only at one short-direction side of a positive electrode 11*x*. The exposed portion 52 may be formed so that the length thereof is 50% or less of the length of the positive electrode 11*x* from the one short-direction side in the short direction. In this case, the exposed portions 52 may also be formed at two surfaces of the positive electrode 11*x* to have the same dimension, and a positive electrode tab 50 is bonded to one of the exposed portions 52. In addition, to one surface of the positive electrode 11*x*, an insulating tape 45 which covers the positive electrode tab 50 and one of the exposed portions 52 is adhered, and to the other surface of the positive electrode 11*x*, an insulating tape 46 which covers the other exposed portion 52 is adhered.

In the example shown in FIG. 5, the width of the insulating tape 46 is larger than the width of the insulating tape 45, the width-direction ends 45*a* and 46*a* are not overlapped with each other in the thickness direction of the positive electrode 11X, and the other width-direction ends 45*b* and 46*b* are also not overlapped with each other in the thickness direction of the positive electrode 11X. For example, the difference in width between the insulating tapes 45 and 46 is 1 mm or more, and at the two width-direction ends, the insulating tapes are adhered to the positive electrode 11X so as to be shifted from each other by 0.5 mm or more.

Although the insulating tapes 45 and 46 are each adhered symmetrically with respect to the center in the width-direction of the exposed portion 52, like the example shown in FIG. 4, the insulating tapes 45 and 46 may also be adhered asymmetrically therewith.

In addition, the length of the insulating tape 46 in the up-down direction is larger than the length of the insulating tape 45 in the up-down direction, and lower ends 45c and 46c thereof are not overlapped with each other in the thickness direction of the positive electrode 11X. On the other hand, the upper ends of the insulating tapes extending past the upper end of the positive electrode 11x are aligned with each other. That is, the insulating tapes 45 and 46 are adhered so that the positions of the lower ends 45c and 46c present at portions overlapped with positive electrode mixture layers 51 are shifted, for example, by 0.5 mm or more in a short direction (up-down direction) of the positive electrode 11X.

The insulating tape includes a base material layer formed, for example, from an insulating organic material and an adhesive layer having an adhesive property to the positive electrode 11. The insulating tape may have a layered structure containing at least three layers, and the base material layer may be formed from a laminate film containing at least two layers, the types of which are equivalent to or different from each other. The thickness of the insulating tape is, for example, 10 to 60 µm and preferably 15 to 40 µm. In addition, in order to improve the heat resistance and the like, the insulating tape may contain an inorganic filler, such as titania, alumina, silica, or zirconia, and besides the base material layer and the adhesive layer, a layer containing an inorganic filter may also be provided.

As a preferable resin forming the base material layer, for example, there may be mentioned a polyester, such as a poly(ethylene terephthalate) (PET), a polypropylene (PP), a polyimide (PI), a poly(phenylene sulfide) (PPS), a poly (ether imide) (PEI), or a polyamide. Among those resins mentioned above, a polyimide having a high mechanical strength (piercing strength) is particularly preferable. The adhesive layer is formed, for example, by applying an adhesive on one surface of the base material layer. Although the adhesive forming the adhesive layer may be either a hot melt type which shows adhesiveness by heating or a thermosetting type which is cured by heating, in view of productivity and the like, an adhesive which shows adhesiveness at room temperature is preferable. One example of the adhesive forming the adhesive layer, an acrylic resin or a synthetic rubber resin may be mentioned.

[Negative Electrode]

The negative electrode 12 includes a belt-shaped negative electrode collector and negative electrode mixture layers formed on two surfaces of the negative electrode collector. For the negative electrode collector, for example, there may be used foil of a metal, such as copper, or a film having a surface layer formed from the metal mentioned above. The thickness of the negative electrode collector is, for example, 5 to 30 µm. In this embodiment, a pair of exposed portions (not shown) at which the surfaces of the negative electrode collector are exposed is formed at longitudinal-direction ends of the collector, that is, at the outer circumferential surface of the electrode body 14 or the vicinity thereof. In addition, to one of the pair of exposed portions formed so as to be overlapped in the thickness direction of the negative electrode 12, the negative electrode tab 21 is bonded.

In addition, first and second insulating tapes are adhered to the negative electrode 12 so as to cover the pair of exposed portions and the negative electrode tab 21. The insulating tapes for the negative electrode 12 may be adhered in a mode similar to that of the insulating tapes for the positive electrode 11 described above or may be adhered in a mode similar to that in the past such that the positions of ends of the insulating tapes are aligned with each other. In addition, in the negative electrode 12, the exposed portions may also be formed at an intermediate portion in the longitudinal direction of the collector, and in this case, the insulating tapes are preferably adhered in a mode similar to that of the insulating tapes for the positive electrode 11.

Negative electrode active material layers are preferably formed over the entire two surfaces of the negative electrode collector except for the exposed portions. The negative electrode active material layer preferably contains a negative electrode active material and a binder. The negative electrode 12 may be formed, for example, such that a negative electrode mixture slurry containing the negative electrode active material, the binder, and water or the like is applied on the two surfaces of the negative electrode collector, followed by compressing the coating films thus formed.

As the negative electrode active material, any material may be used as long as capable of reversibly occluding and releasing lithium ions, and for example, there may be used a carbon material, such as natural graphite or artificial graphite, a lithium titanate composite oxide, a metal, such as Si or Sn, forming an alloy with lithium, or an alloy or a composite oxide containing at least one of those materials mentioned above. In addition, when a material, such as a lithium titanate composite oxide, having a low electrical conductivity is used as the negative electrode active material, an electrically conductive material is preferably added to the negative electrode mixture layer. As the binder, for example, a resin similar to that in the case of the positive electrode 11 may be used. When the negative electrode mixture slurry is prepared using an aqueous solvent, for example, a styrene-butadiene rubber (SBR), a CMC or its salt, a polyacrylic acid or its salt, or a poly(vinyl alcohol) may be used.

EXAMPLES

Hereinafter, although the present disclosure will be further described with reference to examples, the present disclosure is not limited to the following examples.

Example 1

[Formation of Positive Electrode]

After 100 parts by mass of a lithium nickel oxide represented by $LiNi_{0.815}Co_{0.15}Al_{0.035}O_2$ as a positive electrode active material, 1 part by mass of acetylene black, and 0.9 parts by mass of a poly(vinylidene fluoride) were mixed together, N-methyl-2-pyrrolidone (NMP) was further added, so that a positive electrode mixture slurry was obtained. This positive electrode mixture slurry was applied on two surfaces of a long positive electrode collector formed from aluminum foil, followed by drying the coating films thus formed. After the coating films thus dried were compressed using rollers, a predetermined electrode size was obtained by cutting, so that a positive electrode in which positive electrode mixture layers were formed on the two surfaces of the collector was formed. At central portions in a longitudinal direction of two surfaces of the positive electrode, exposed portions at which no mixture layers were formed and at which the surfaces of the collector were exposed were provided, and to one of the exposed portions, an aluminum-made positive electrode tab (thickness: 0.1 mm, width: 3.5 mm) was ultrasonic welded. The exposed portions were each formed over the entire length in a short direction of the positive electrode to have a width of 6 mm.

Subsequently, polyimide-made insulating tapes were adhered to the two surfaces of the positive electrode so as to cover the entire regions of the exposed portions formed at the two surfaces of the positive electrode. To one exposed portion (first exposed portion) to which the positive electrode tab was welded, an insulating tape having a width of 10 mm was adhered, and to the other exposed portion (second exposed portion), an insulating tape having a width of 11 mm was adhered. In order not to overlap a width-direction end of the tape with a width-direction end of the other tape, and not to overlap the other width-direction end of the tape with the other width-direction end of the other tape, the insulating tapes were adhered such that the two width-direction ends of the tape were shifted from the respective two width-direction ends of the other tape in the longitudinal direction of the positive electrode by 0.5 mm (see FIG. 3).

[Formation of Negative Electrode]

After 100 parts by mass of a graphite powder, 1 part by mass of a sodium carboxymethyl cellulose, and 1 part by mass of a dispersion of a styrene-butadiene rubber were mixed together, an appropriate amount of water was further added, so that a negative electrode mixture slurry was prepared. Next, the negative electrode mixture slurry was applied on two surfaces of a long negative electrode collector formed from copper foil, followed by drying the coating films thus formed. After the coating films thus dried were compressed by rollers, a predetermined electrode size was obtained by cutting, so that a negative electrode in which negative electrode mixture layers were formed on the two surfaces of the negative electrode collector was formed. An exposed portion at which no mixture layer was formed and at which the surface of the negative electrode collector was exposed was provided at a longitudinal-direction end portion (portion functioning as a winding-finish side end portion) of the negative electrode, and to this exposed portion, a nickel-made negative electrode lead was ultrasonic welded.

[Preparation of Nonaqueous Electrolyte]

Fluoroethylene carbonate (FEC), ethyl methyl carbonate (EMC), and dimethyl carbonate (DMC) were mixed together at a volume ratio of 15:45:40. To this mixed solvent, 1.5 parts by mass of vinylene carbonate (VC) was added, and $LiPF_6$ was dissolved therein to have a concentration of 1 mole/L, so that a nonaqueous electrolyte was prepared.

[Formation of Battery]

The positive electrode and the negative electrode were spirally wound with separators interposed therebetween, the separators each being formed from a polyethylene-made porous film which had one surface on which a heat resistant layer composed of an aramid resin was provided, so that a winding type electrode body was formed. In this step, the separator was disposed so that the heat resistant layer faced a positive electrode side. After this electrode body was received in a bottom-closed cylindrical metal-made exterior package can (outside diameter: 21 mm, height: 70 mm), an extending portion of a positive electrode tab and an extending portion of a negative electrode lead were welded to a filter of a sealing body and an inner surface of a bottom of the exterior package can, respectively. In addition, the nonaqueous electrolyte liquid was charged in the exterior package can, and an opening portion of the exterior package can was sealed by the sealing body, so that a cylindrical battery was formed. In this cylindrical battery, the positive electrode tab was provided at a position apart from an outer circumferential surface of the exterior package can in the radius direction thereof by 4.0 mm (L=4.0 mm shown in FIG. 2).

Example 2

Except for that the exposed portions of the positive electrode were formed so that the positive electrode tab was provided at a position apart from the outer circumferential surface of the exterior package can in the radius direction thereof by 4.7 mm, a cylindrical battery was formed in a manner similar to that of Example 1.

Comparative Example 1

Except for that in Example 1, polyimide-made insulating tapes having the same width (11 mm) were adhered to the first exposed portion and the second exposed portion so that the width-direction ends of the tapes were overlapped in the thickness direction of the positive electrode and the other width-direction ends of the tapes were also overlapped in the thickness direction of the positive electrode, a cylindrical battery was formed in a manner similar to that of Example 1.

Comparative Example 2

Except for that the exposed portions of the positive electrode were formed so that the positive electrode tab was provided at a position apart from the outer circumferential surface of the exterior package can in the radius direction thereof by 4.7 mm, a cylindrical battery was formed in a manner similar to that of Comparative Example 1.

[Impact Test]

By the use of the cylindrical batteries of Examples and Comparative Examples, an impact test was performed in accordance with the following procedure.

(1) The cylindrical battery is placed on a flat test stage so that a side surface portion of the battery is in contact with the test stage.

In this step, the battery was fixed to the test stage so that the insulating tapes and one end of the positive electrode tab are located at a lower side (test stage side) in the battery.

(2) On the side surface portion of the battery, a round bar (diameter: 15.8 mm) is disposed in parallel with the test stage.

(3) A weight (9.1 kg) is allowed to freely fall from a height of 610 mm above the test stage so that the weight collides with the round bar and applies an impact to the side surface portion of the battery through the round bar.

The impact test was performed on four batteries obtained in each of Examples and Comparative Examples. After the impact test was performed, the battery was disassembled, and whether the separator was damaged by short circuit or not was confirmed. The test results thus obtained are shown in Table 1.

TABLE 1

| | SHIFT BETWEEN INSULATING TAPES | POSITION OF POSITIVE ELECTRODE TAB | NUMBER OF SHORT-CIRCUITED BATTERIES |
|---|---|---|---|
| EXAMPLE 1 | 0.5 mm (1 mm BY TWO ENDS) | 4.0 mm | 2 |
| COMPARATIVE EXAMPLE 1 | 0 mm | 4.0 mm | 4 |

TABLE 1-continued

| | SHIFT BETWEEN INSULATING TAPES | POSITION OF POSITIVE ELECTRODE TAB | NUMBER OF SHORT-CIRCUITED BATTERIES |
|---|---|---|---|
| EXAMPLE 2 | 0.5 mm (1 mm BY TWO ENDS) | 4.7 mm | 0 |
| COMPARATIVE EXAMPLE 2 | 0 mm | 4.7 mm | 4 |

From the results shown in Table 1, it is found that compared to the batteries of Comparative Examples, the batteries of Examples are each not likely to generate short circuit by the impact test. In particular, since the positive electrode tab was provided at a position apart from the outer circumferential surface of the exterior package can in the radius direction thereof by 4.7 mm, a further improvement in impact resistance could be confirmed (Example 2). On the other hand, in the battery of Comparative Example, although the positive electrode tab was provided at a position apart from the outer circumferential surface of the exterior package can in the radius direction thereof by 4.7 mm, an effect of improving the impact resistance could not be obtained.

REFERENCE SIGNS LIST

10 nonaqueous electrolyte secondary battery, 11 positive electrode, 12 negative electrode, 13 separator, 14 electrode body, 15 battery case, 16 exterior package can, 17 sealing body, 18 and 19 insulating plate, 20 and 50 positive electrode tab, 21 negative electrode tab, 22 groove portion, 23 filter, 24 lower valve, 25 insulating member, 26 upper valve, 27 cap, 28 gasket, 30 positive electrode collector, 31 and 51 positive electrode mixture layer, 32, 32A, 32B, and 52 exposed portion, 40 and 45 insulating tape (first insulating tape), 40a, 41a, 43a, 45a, and 46a width-direction end, 40b, 41b, 43b, 45b, and 46b other width-direction end, 41, 43, and 46 insulating tape (second insulating tape), 45c and 46c lower end

The invention claimed is:

1. A nonaqueous electrolyte secondary battery comprising:
   an electrode body in which a positive electrode and a negative electrode are wound along a longitudinal direction thereof with a separator interposed therebetween, at least one of the positive electrode and the negative electrode including a belt-shaped collector, first and second mixture layers respectively formed on two surfaces of the collector, and a pair of exposed portions at which the two surfaces of the collector are exposed,
   wherein the pair of exposed portions is formed at an intermediate portion in a longitudinal direction of the collector;
   an electrode tab bonded to one of the pair of exposed portions;
   a first insulating tape adhered to the electrode so as to cover the one of the pair of exposed portions,
   wherein a part of the first insulating tape covers a portion of the first mixture layer adjacent to the one of the pair of exposed portions in a longitudinal direction of the electrode; and
   a second insulating tape adhered to the electrode so as to cover the other one of the pair of exposed portions,
   wherein a part of the second insulating tape covers a portion of the second mixture layer adjacent to the other one of the pair of exposed portions in the longitudinal direction of the electrode,
   wherein at least a part of the collector where the electrode tab is bonded is sandwiched between the first insulating tape and the second insulating tape,
   wherein the first insulating tape has a first pair of tape ends in the longitudinal direction of the electrode, and the second insulating tape has a second pair of tape ends in the longitudinal direction of the electrode,
   the first insulating tape and the second insulating tape are disposed so as to define a non-overlap region in which at least one of the first pair of tape ends and a corresponding one of the second pair of tape ends are not overlapped with each other in a thickness direction of the electrode, and
   only one of the first insulating tape and the second insulating tape is present in the non-overlap region when viewed in a radial direction of the electrode body.

2. The nonaqueous electrolyte secondary battery according to claim 1,
   wherein the first insulating tape and the second insulating tape are disposed so that the one ends thereof located at the one direction side along the longitudinal direction of the electrode are shifted from each other in the longitudinal direction of the electrode by 0.5 mm or more.

3. The nonaqueous electrolyte secondary battery according to claim 1,
   wherein the first insulating tape has a width larger than the width of the second insulating tape by 1 mm or more.

4. The nonaqueous electrolyte secondary battery according to claim 1,
   wherein the first insulating tape and the second insulating tape are disposed so the other ends of the first insulating tape and the second insulating tape opposite to one direction side along the longitudinal direction of the electrode are not overlapped with each other in the thickness direction of the electrode.

5. The nonaqueous electrolyte secondary battery according to claim 1,
   wherein the electrode is the positive electrode.

6. The nonaqueous electrolyte secondary battery according to claim 1,
   further comprising a bottom-closed cylindrical exterior package can,
   wherein the electrode tab is provided at a position apart from an outer circumferential surface of the exterior package can in a radius direction thereof by 4 mm or more.

7. The nonaqueous electrolyte secondary battery according to claim 1,
   wherein the one of the pair of exposed portions has a first pair of ends in the longitudinal direction of the collector, and the other one of the pair of exposed portions has a second pair of ends in the longitudinal direction of the collector,
   wherein the first pair of ends and the second pair of ends coincide with each other in a thickness direction of the collector.

* * * * *